United States Patent [19]

Komine

[11] 4,320,947
[45] Mar. 23, 1982

[54] CAMERA WITH AUTOMATIC FOCUSING DEVICE

[75] Inventor: Yoshio Komine, Yokohama, Japan

[73] Assignee: Canon Kabushiki Kaisha, Tokyo, Japan

[21] Appl. No.: 217,825

[22] Filed: Dec. 18, 1980

[30] Foreign Application Priority Data

Dec. 26, 1979 [JP] Japan .......................... 54/180502[U]
Dec. 28, 1979 [JP] Japan .......................... 54/184287[U]

[51] Int. Cl.³ ............................................... G03B 3/10
[52] U.S. Cl. ....................................... 354/25; 352/140
[58] Field of Search ................... 352/140; 354/25, 195; 355/56

[56] References Cited

U.S. PATENT DOCUMENTS 4,225,219 9/1980 Shimizu ................................ 354/25

Primary Examiner—Michael L. Gellner
Attorney, Agent, or Firm—Fitzpatrick, Cella, Harper & Scinto

[57] ABSTRACT

This invention provides a movie camera or a television camera provided with an automatic focusing device, featured by an arrangement in which the automatic focusing device is positioned above the taking lens in the front face of the camera and a digital switch for generating the distance adjust signal for the focusing lens is positioned on the lateral face of the camera.

3 Claims, 7 Drawing Figures

CAMERA WITH AUTOMATIC FOCUSING DEVICE

BACKGROUND OF THE INVENTION

1. Field of the Invention

The present invention relates to a camera provided with an automatic focusing device, and more particularly to a movie camera or a television camera provided with a rangefinding optical system for automatic focusing independently from the picture taking lens.

2. Description of the Prior Art

Cameras with automatic focusing function, particularly movie cameras with such function, have been commercialized in recent years, but these cameras are invariably associated with significantly larger dimensions than in the conventional cameras. As already known, the automatic focusing method employed in the presently commercialized automatic focusing movie cameras is based on the same working principle as in the conventional double-image matching range-finder, utilizing two incident beams guided to photodetector elements through two mirrors of which one is movable, and a focusing signal is generated in response to the time required for the matching of two image corresponding to the distance to the object for controlling a switch to be actuated in cooperation with the displacement of the focusing lens in the picture-taking system. Such automatic focusing camera will therefore require, in addition to the mechanisms of the conventional camera, an automatic focus detecting unit consisting of an automatic focusing optical system and photodetector elements, a motor for driving the mirror in the range-finding optical system, a drive mechanism for picture-taking focusing lens, a drive motor therefore, a mechanism for detecting the amount of displacement of the focusing lens, electric circuits for controlling the automatic control etc., of which addition inevitably results in the increase of dimensions, thus deteriorating the handling characteristics of such automatic focusing movie cameras.

In another method the range-finding mechanism and the focusing lens are mechanically separated but are linked and controlled through comparison of electric signals, as disclosed in the copending U.S. Patent Applications Ser. Nos. 944,974 and 121,690 respectively filed Sept. 22, 1978 and Feb. 15, 1980. Such method is advantageous, due to the absence of a mechanical link between the range-finding mechanism and the focusing lens, in allowing independent adjustment and providing a larger freedom in the layout. Such method however requires signal generating means for indicating the distance at which the focusing lens is adjusted. For this purpose a potentiometer is usually used as an encoder coupled with rotation of the focusing lens, but such solution cannot be considered ideal in consideration of the precision, cost and space required.

Still another solution lies on the use of a digital switch board composed of code patterns provided on a printed circuit board corresponding to the number of addresses required for representing the focus distance of the picture taking lens in a desired precision from infinity to the closest focus distance in combination with a brush sliding over said code patterns in response to the displacement of the focusing lens, and such method is considered most preferable for use in ordinary movie cameras in consideration of the achievable cost and precision. In such a digital switch board the number of steps of distance divisions from the infinity to the closest focus distance depends on the precision required by the taking lens, and for example requires 5-bit code patterns for 32-step distance divisions.

In general, such digital switch is preferably formed as a circular encoder positioned close to the picture taking lens. However, in a movie camera or a television camera, a larger lens tube diameter than the camera body thickness is not desirable from the practical and esthetic point of view, and, for this reason, it becomes difficult to position a flat-shaped digital switch in the vicinity of the picture taking lens. It would also be possible to mount a tubular printed circuit board having such code patterns around the lens tube, but the preparation of inexpensive code patterns having satisfactory surface smoothness and abrasion resistance has not been achieved so far.

SUMMARY OF THE INVENTION

The object of the present invention is to provide an automatic focusing camera in which the focusing lens is automatically focused by means of an output signal from a range-finding device for detecting the distance to an object and a focus distance signal from said focusing lens, wherein the range-finding device, the digital switch utilized for generating the focus distance signal, the focusing lens drive mechanism etc. are so arranged as to realize a camera dimension not much different from that of the conventional camera without such automatic focusing function, while still maintaining satisfactory camera performance and handling.

The present invention will be clarified in detail by the following description of the preferred embodiments to be taken in conjunction with the attached drawings.

DESCRIPTION OF THE PREFERRED EMBODIMENTS

Figure 1:
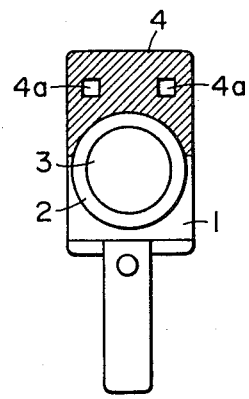
FIG. 1 is a front elevation view of a movie camera embodying the present invention.
Figure 2:
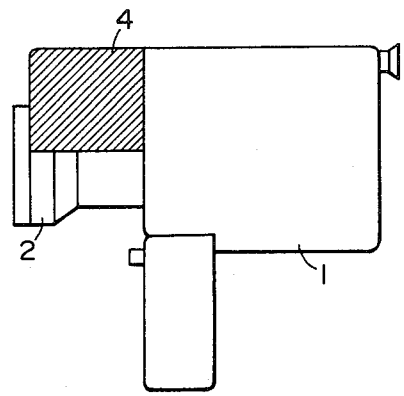
FIG. 2 is a side view of said camera.

In FIGS. 1 and 2 there are shown a camera body 1, a lens tube 2 of a picture taking lens 3, a housing section 4 for an automatic focusing device represented by the hatched areas and positioned in the frontal portion of the camera body above said lens tube, and windows 4a, 4b for the range-finding device.

Figure 3:
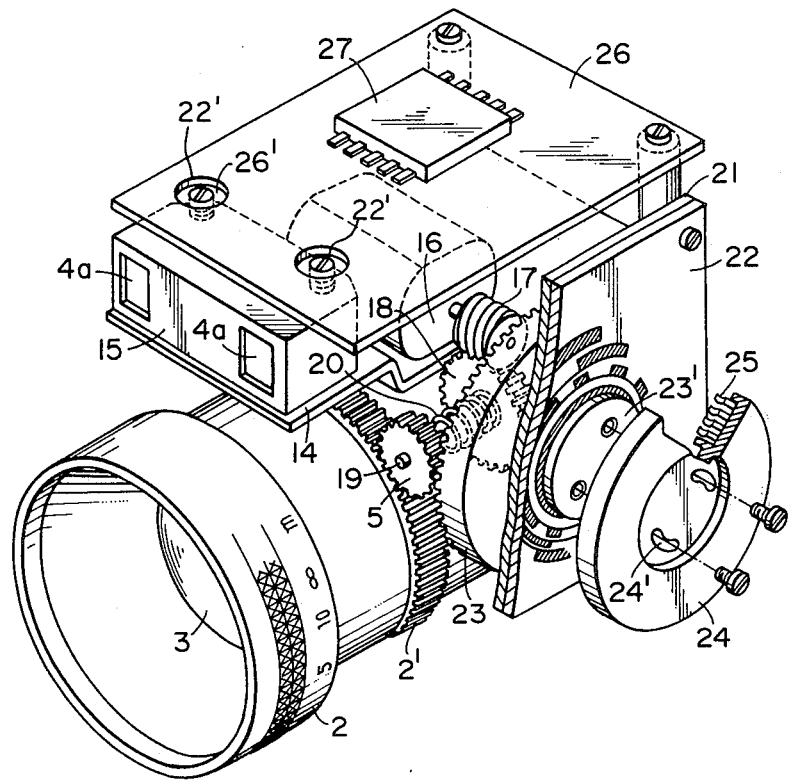
FIG. 3 is a perspective view showing the automatic focusing device of said camera.

FIG. 3 shows, in a perspective view, the picture taking lens tube and the automatic focusing mechanism of an embodiment of the present invention, wherein there are shown a base plate 14 fixed to the camera body 1 for supporting the automatic focusing mechanism, and range-finding device 15 of said device fixed to said base plate 14.

Said range-finding device 15 is provided with two mirrors or prisms for guiding two images to photosensor elements, a range-finding optical system composed of two imaging lenses, and photosensor elements composed of line sensors such as charge-coupled devices.

Said sensor elements are so structured as to generate an electric output signal representing the distance of two images on said elements corresponding to the distance to object without the movement of said mirrors, so that said range-finding device 15 is rendered completely independent from links with other units except the electrical input and output signals. There is provided an adjusting member 22' on the outer face of said range-finding device for adjusting the unrepresented range-finding optical system provided in said device. A motor 16 for driving the focusing lens tube 2 is provided with a worm gear 17, meshing with a worm wheel 18 rotatably fitted around a shaft 19 to transmit the motor rotation to a pinion 5 through a friction spring 20 provided around said shaft. At the rear end of said focusing lens tube 2 there is provided a gear 2' meshing with said pinion to rotate said lens tube 2 by said motor 16 whereby said lens tube 2 is axially displaced by means of an unrepresented helicoid for focusing.

A lateral base plate 21 is provided at the side of said base plate 14 for supporting a printed circuit board 22 having digital code patterns. A crown gear 23 meshing with said pinion 5 is rotatably supported by a shaft 23' and a bearing provided in the base plate 21. On the end face of said shaft 23' there is fixed, by screws, a rotary plate 24 which is internally provided with a comb-tooth brush 25 having plural contacts maintained in slide contact with said digital code patterns of the printed circuit board 22 for generating signals corresponding to the focused position of the focusing lens in response to the rotation of said crown gear 23. The mounting of said rotary plate to the crown gear is achieved through oblong holes 24 in order to adjust the relation between said digital code patterns and the contact brush.

In FIG. 3 the rotary plate 24 is shown partially broken away in order to reveal the contact brush 25. A circuit board 26 is provided for supporting an integrated control circuit 27 for automatic focusing and other electric components omitted for simplicity in FIG. 3. A hole 26' is provided on said circuit board 26 corresponding to the position of said adjusting member of the range-finding device 15 provided thereunder, thereby enabling the adjustment thereof through said circuit board 26 even when it is so structured as to cover the range-finding device 15 as shown in FIG. 3.

Figure 4:
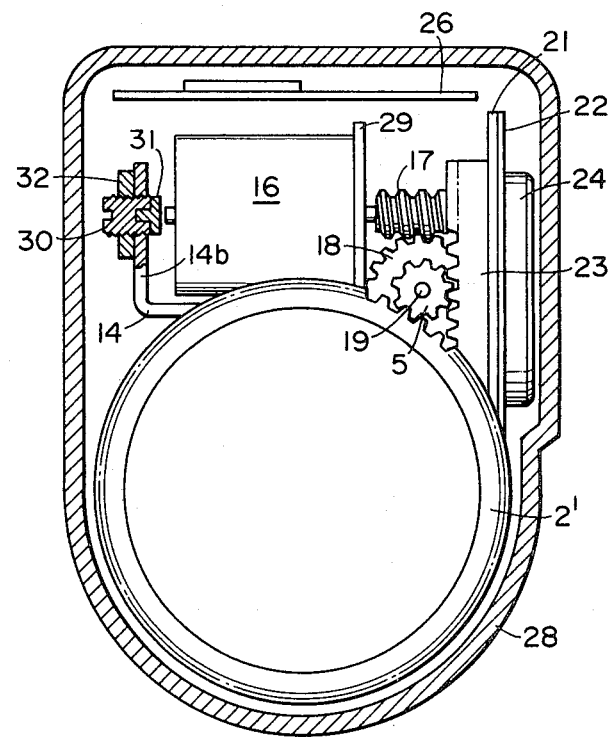
FIG. 4 is a cross-sectional view of said device.

FIG. 4 shows a part of the automatic focusing device of FIG. 3 seen from the front of the camera, wherein there are shown a camera housing 28, and a motor base plate 29 fixed to the base plate 14 for supporting the motor 16. An adjust screw 30 screwed into a bent portion 14b of said base plate 14 is provided with a plastic stop member 31 which is so adjusted to a position as to prevent the axial displacement of the shaft of motor 16. A nut 32 is provided for fixing the screw 30 after the adjustment thereof.

As shown in FIGS. 3 and 4, the rotation of the motor 16 is transmitted through the worm plate 17, worm wheel 18, friction spring 20 and gear 5 to the outer gear 2' of the lens tube. Said gear 5 is also meshing with the crown gear 23, whereby the focusing lens tube 2 and the digital switch board composed of the components 22, 24 and 25 are maintained at a determined rotary ratio. When the focusing lens tube 2 is externally operated manually, the gears meshing with said outer gear 2' constitute a load against such manual rotation of the lens tube, but such manual rotation can be facilitated by suitable adjustment of the friction spring 20 allowing the rotation of the gear 5 alone. As explained in the foregoing, the arrangement of the motor 16 having the rotary shaft perpendicular to the gears meshing with the outer gear 2' and to the lateral face of the camera allows to install the reducing mechanism, friction mechanism and transmission to the digital switch board within a limited space. Also as will be easily understood from FIG. 4, the manual rotation of the focusing lens tube 2 applies, through gears 5 and 18, an axial force to the worm gear 17 and causes an axial displacement thereof due to the axial play usually present in the motor 16, thus causing the user to feel a play in the focusing lens tube, but, according to the present invention, it is rendered possible to cancel the axial play in the motor by fixing said adjust screw 30 at a position close to the motor shaft.

Figure 5:
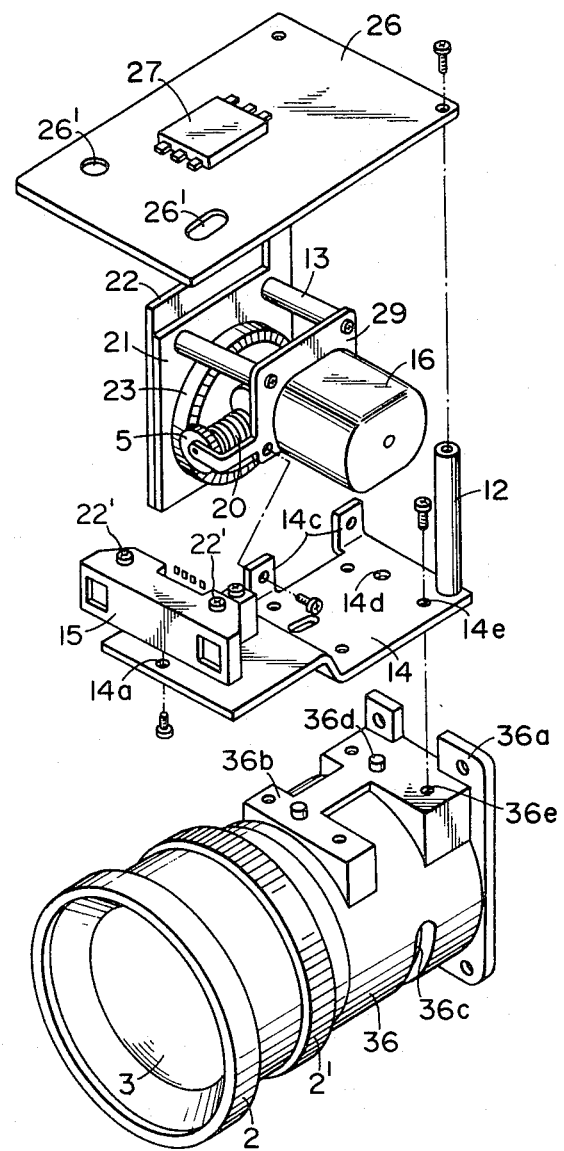
FIGS. 5 to 7 are views of another embodiment shown, respectively, in an exploded perspective view, a lateral cross-sectional view and a longitudinal cross-sectional view.
Figure 6:
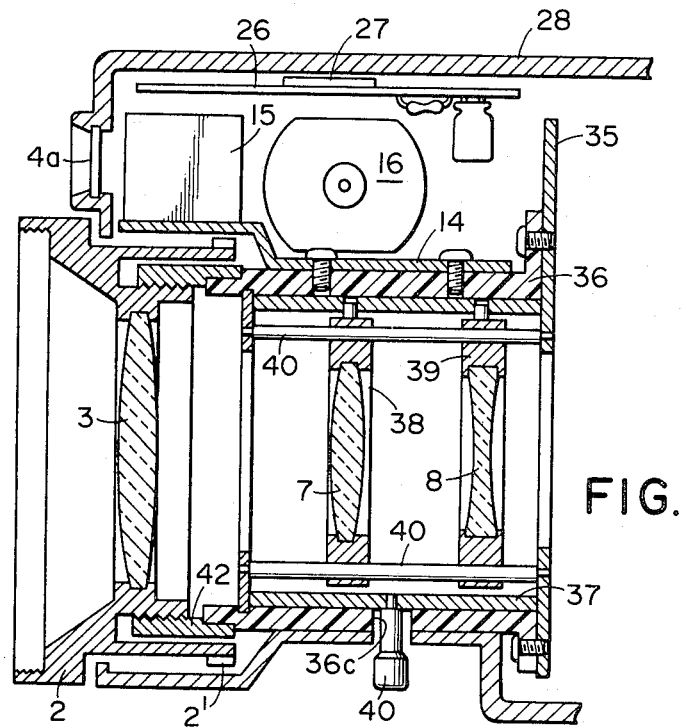
Figure 7:
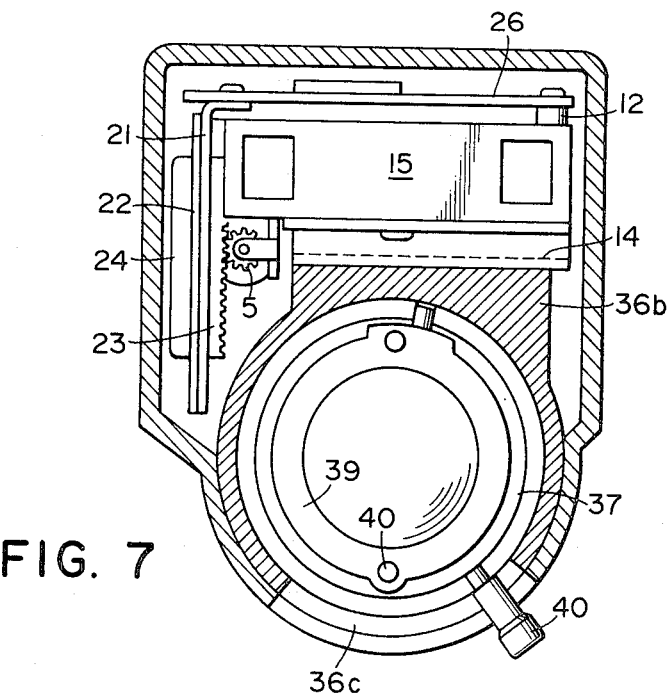

FIGS. 5 to 7 show another embodiment of the present invention, wherein the members having the same function as in the foregoing embodiment are represented by the same numbers.

In this embodiment a zoom lens is moved by a cam ring in a fixed lens tube to avoid the presence of moving parts on the outside thereof, and the automatic focusing device is directly mounted on said fixed lens tube.

In FIG. 6, a fixed lens tube 36 composed of a reinforced plastic material such as glass fiber-reinforced polycarbonate is provided integrally with a flange 36a at the rear end thereof and is fixed with screws to a lens base plate 35 mounted on the camera body 1. A housing 36b is integrally formed on the lens tube and is provided with screw holes 36e and positioning pins 36d for mounting the base plate 14 for the automatic focusing device.

A cam ring 37 rotatably fitted inside the lens tube 36 is provided with cam grooves in which fitted are pins of lens tubes 38, 39 respectively supporting the movable elements 7, 8 of the zoom lens, thereby the rotation of the ring 36 by the zooming lever 40 causes displacements of said movable elements under a determined relationship according to said cams thus achieving a zooming function. There are further provided guide bars 41 for said lens tubes 38, 39, and a groove 36c provided in the lens tube 36 for said zooming lever 40.

At the front end of the lens tube 36 there is provided a female helicoid ring 42 in which said focusing lens tube is rotatably screwed, whereby the lens 3 is axially displaced for focusing by means of said helicoid screw in response to the rotation of said lens tube 2.

As shown in FIG. 5, the base plate 14 is positioned and screwed to the upper face of the housing on the fixed lens tube by means of positioning holes 14c engaging with the aforementioned pins 36d and of plural mounting holes 14d.

A motor base plate 29 fixed with screws to vertically rising portions 14c of the base plate 14 supports the aforementioned motor 16, gears 17, 18, 5 and lateral base plate 21 through a spacer 13, said lateral base plate supporting the aforementioned printed circuit board 22, crown gear 23 and rotary plate 24 having brush 26 for generating the distance signal. The range-finding device 15 is directly fixed by screws to a front portion 14a of the base plate 14 while the circuit board 26 is fixed on the base plate 14 with plural supports 12 so as to be substantially level with the upper structure of the camera, whereby the entire automatic focusing device can be housed in the hatched portion 4 in FIGS. 1 and 2.

As explained in the foregoing, the present invention provides an automatic focusing camera capable of controlling the focusing lens by the output signal of a range-finding device and the focus position signal from the focusing lens, wherein a digital switch composed of a printed circuit board having digital code patterns and a rotary plate having brushes in sliding contact with said patterns is provided as the focus position signal in such a manner that said rotary plate is made rotatable about an axis perpendicular to the lateral face of the camera body and is rotated by the focusing lens drive motor in response to the displacement of said focusing lens. In this manner the range-finding device, the motor positioned therebehind and said digital switch are composed as a single automatic focusing unit which can be accommodated above the lens tube at the front face of the camera body without significant increase in the camera dimension.

I claim:

1. A camera with an automatic focusing device, comprising:

a picture-taking lens comprising a focusing lens; and an automatic focusing unit accommodated in a space above said picture-taking lens and inside the camera body comprising:

a range-finding device provided with photosensor elements and optical systems adapted for generating a signal corresponding to the distance from the camera to the object;

drive means positioned behind said range-finding device and provided with a motor for driving said focusing lens;

signal generating means for indicating the focus position of the focusing lens, said means being positioned parallel to the lateral face of the camera at a side of said motor and being composed of a digital switch board consisting of a printed circuit board having digital code patterns and fixed to a base plate and of a rotary plate supporting contact brushes maintained in sliding contact with said printed circuit board and adapted to rotate in response to said focusing lens drive means, thus generating a signal corresponding to the focus position of said focusing lens;

an electric circuit adapted for controlling said motor in response to the signal from said range-finding device and the focus position signal from said focusing lens; and a circuit board having said electric circuit thereon and so positioned as to cover said range-finding device and said drive means.

2. A camera according to the claim 1, wherein said rotary plate constituting said digital switch is linked with a crown gear rotatably supported by the base plate supporting said printed circuit board and rotatable in cooperation with a gear provided on the lens.

3. A camera according to the claim 1, wherein the picture-taking lens is provided with a fixed lens tube on which said automatic focusing unit is mounted.

* * * * *